(12) United States Patent
Bando (10) Patent No.: US 11,891,325 B2
(45) Date of Patent: Feb. 6, 2024

(54) GLASS PLATE BEND-BREAKING MACHINE

(71) Applicant: BANDO KIKO CO., LTD., Tokushima (JP)

(72) Inventor: Kazuaki Bando, Tokushima (JP)

(73) Assignee: BANDO KIKO, CO., LTD., Tokushima (JP)

( * ) Notice: Subject to any disclaimer, the term of this patent is extended or adjusted under 35 U.S.C. 154(b) by 0 days.

(21) Appl. No.: 16/333,321

(22) PCT Filed: Jul. 31, 2018

(86) PCT No.: PCT/JP2018/028761
§ 371 (c)(1),
(2) Date: Mar. 14, 2019

(87) PCT Pub. No.: WO2019/026931
PCT Pub. Date: Feb. 7, 2019

(65) Prior Publication Data
US 2019/0248694 A1    Aug. 15, 2019

(30) Foreign Application Priority Data

Aug. 1, 2017    (JP) ................................. 2017-149541

(51) Int. Cl.
*C03B 33/03*    (2006.01)
*B26F 3/00*    (2006.01)
*B28D 5/00*    (2006.01)

(52) U.S. Cl.
CPC ............... *C03B 33/03* (2013.01); *B26F 3/00* (2013.01); *B28D 5/00* (2013.01)

(58) Field of Classification Search
CPC ............................. C03B 33/03; C03B 33/033
See application file for complete search history.

(56) References Cited

U.S. PATENT DOCUMENTS 2,078,386 A * 4/1937 Kendis .................. C03B 33/027
33/32.6
3,216,635 A * 11/1965 Lefevre ................. C03B 33/027
225/96.5
(Continued)

FOREIGN PATENT DOCUMENTS

EP    1 031 541 A1    8/2000
EP    1 647 534 A1    4/2006
(Continued)

OTHER PUBLICATIONS

Notice of Reasons for Rejection dated Jun. 27, 2019 in Korean Application No. 10-2019-7007495, with summarized English Translation, 7 pages.
(Continued)

*Primary Examiner* — Sean M Michalski
(74) *Attorney, Agent, or Firm* — Nixon & Vanderhye P.C.

(57) ABSTRACT

A glass plate bend-breaking machine 1 includes: a flexible endless belt 3; a supporting member 4 for supporting the endless belt 3; two glass plate receiving devices 7 and 7a respectively having glass plate receiving surfaces 6 and 6a; moving devices 8 and 8a for respectively moving the glass plate receiving devices 7 and 7a in an X direction and a Y direction perpendicular to the X direction; two press-breaking devices 9 and 9a; and moving devices 10 and 10a for respectively moving the press-breaking devices 9 and 9a in the X direction and the Y direction perpendicular to the X direction.

3 Claims, 9 Drawing Sheets

(56) References Cited

U.S. PATENT DOCUMENTS

| | | | |
|---|---|---|---|
| 5,400,939 A | 3/1995 | Bando | |
| 6,218,793 B1* | 4/2001 | Bando | C03B 33/027 225/96.5 |
| 7,059,938 B2* | 6/2006 | Bando | C03B 33/074 451/335 |
| 7,204,400 B2* | 4/2007 | Marek | C03B 33/07 225/2 |
| 8,439,241 B2* | 5/2013 | Stangl | C03B 33/10 225/2 |
| 8,496,150 B2* | 7/2013 | Lee | B26F 3/002 225/96.5 |
| 9,822,029 B2* | 11/2017 | Yamamoto | C03B 33/033 |
| 10,035,724 B2* | 7/2018 | Cleary | C03B 33/03 |
| 10,793,464 B2* | 10/2020 | Bando | C03B 33/037 |
| 10,919,795 B2* | 2/2021 | Bando | B26F 3/00 |
| 2004/0040997 A1* | 3/2004 | Ueyama | B28D 5/0011 225/96.5 |
| 2006/0081673 A1* | 4/2006 | Schenk | C03B 33/04 225/1 |
| 2007/0095108 A1* | 5/2007 | Kirby | C03B 17/068 65/435 |
| 2010/0294748 A1* | 11/2010 | Garner | C03B 33/04 219/121.72 |
| 2011/0143639 A1* | 6/2011 | Bando | H01L 21/677 225/2 |
| 2011/0277507 A1* | 11/2011 | Lu | C03B 33/0215 65/97 |
| 2013/0181026 A1* | 7/2013 | Su | B26F 3/002 225/103 |
| 2014/0239034 A1* | 8/2014 | Cleary | C03B 33/033 225/2 |
| 2015/0034691 A1* | 2/2015 | Takaichi | H02K 15/03 225/2 |
| 2015/0158197 A1* | 6/2015 | Takaichi | H01F 41/0253 225/3 |
| 2015/0321940 A1* | 11/2015 | Dannoux | C03B 23/0235 65/273 |
| 2016/0280579 A1* | 9/2016 | Yamamoto | C03B 33/033 |
| 2018/0044220 A1* | 2/2018 | Bando | B65G 49/064 |

FOREIGN PATENT DOCUMENTS

| | | | |
|---|---|---|---|
| JP | 4-144931 | * 5/1992 | C03B 33/03 |
| JP | 7237929 A | 9/1995 | |
| JP | 08-217475 | 8/1996 | |
| JP | 2006-117518 A | 5/2006 | |
| JP | 2013-43348 A | 3/2013 | |
| JP | 2014-55109 A | 3/2014 | |
| SU | 528268 A1 | 9/1976 | |
| SU | 1350120 A1 | 11/1987 | |
| WO | 00/12439 | 3/2000 | |
| WO | WO 2016/079951 A1 | 5/2016 | |

OTHER PUBLICATIONS

Russian Office Action dated Nov. 15, 2019 in Russian Application No. 2019108383, with English Gist of the Office Action, 8 pages.
International Search Report for PCT/JP2018/028761 filed Oct. 23, 2018, 2 pages.
International Search Report dated Sep. 11, 2018 in International Application No. PCT/JP2018/026347, 2 pages.
Notice of Reasons for Rejection dated Jan. 31, 2019 in Korean Application No. 2018-562266 with English translation (6 pages).
Office Action dated Sep. 30, 2020 issued in Indian Application No. 201917007517 including English translation (7 pages).
Extended European Search Report dated Feb. 25, 2020 in European Application No. 18840393.5, 7 pages.
Office Action dated Jan. 31, 2023 issued in Chinese Application No. 201880003563.2 with English translation (17 pages).

* cited by examiner

ABSTRACT

GLASS PLATE BEND-BREAKING MACHINE

This application is the U.S. national phase of International Application No. PCT/JP2018/028761 filed Jul. 31, 2018 which designated the U.S. and claims priority to JP Patent Application No. 2017-149541 filed Aug. 1, 2017, the entire contents of each of which are hereby incorporated by reference.

TECHNICAL FIELD

The present invention relates to a machine for bend-breaking a glass plate.

BACKGROUND ART

Glass plate bend-breaking machines are known in which a press-breaking device is moved within a plane, which is parallel to the surface of a glass plate placed on an endless belt, and along a bend-breaking line formed on the glass plate, while a glass plate receiving device is moved below the endless belt in correspondence with the movement of the press-breaking device.

PRIOR ART DOCUMENT

Patent Document

[Patent Document 1] JP-A-H8-217475

SUMMARY OF THE INVENTION

Problems that the Invention is to Solve

In such a glass plate bend-breaking machine, at the time of press-breaking a glass plate along a cut line, generally, a glass plate receiving surface of a glass plate receiving device is disposed on the lower surface of the glass plate inside a region surrounded by a bend-breaking line, and a push rod is pressed, outside the region surrounded by the bend-breaking line, against the upper surface of the glass plate whose lower surface is supported by the glass plate receiving surface disposed inside such a region, thereby bend-breaking the glass plate by press-breaking the glass plate along the bend-breaking line. Therefore, at the time when, after press-breaking, the glass plate receiving surface is moved to an ensuing press-breaking position, there are cases where bend-broken cullet after press-breaking is pushed up by the glass plate receiving surface, and when such pushing up of the bend-broken cullet occurs, that bend-broken cullet can collide against a bend-broken surface of the glass plate as a product after press-breaking, thereby possibly causing chipping or the like of the glass plate as a product at the bend-broken surface.

The present invention has been devised in view of the above-described aspects, and its object is to provide a glass plate bend-breaking machine which does not cause chipping or the like on the bend-broken surface of the glass plate as a product after press-breaking.

Means for Solving the Problems

A machine for bend-breaking a glass plate in accordance with the present invention is comprised of: a flexible member on which the glass plate with a cut line formed thereon is placed; a supporting mechanism having a supporting surface for supporting the glass plate at a central portion of a lower surface of the glass plate by means of the flexible member; a glass plate receiving device having a glass plate receiving surface for receiving the glass plate from a lower surface of the glass plate by means of the flexible member and disposed below the flexible member; a first moving device for moving the glass plate receiving device; a press-breaking device disposed above the flexible member and having a pressing surface for press-breaking along a cut line the glass plate with the cut line formed thereon; and a second moving device for moving the press-breaking device, wherein the first moving device is adapted to move the glass plate receiving device such that, at the time of press-breaking of the glass plate by the pressing surface, the glass plate receiving surface is disposed at a position outside a region of the glass plate surrounded in a plan view by the cut line, and the second moving device is adapted to move the press-breaking device such that, at the time of press-breaking of the glass plate by the pressing surface, the pressing surface is disposed at the position outside the region of the glass plate surrounded in a plan view by the cut line, in correspondence with the glass plate receiving surface, and wherein press-breaking of the glass plate along the cut line by the pressing surface is effected with respect to the glass plate outside the region, surrounded by the cut line, of the glass plate deflected by the glass plate receiving surface disposed above the supporting surface of the supporting mechanism.

According to such a glass plate bend-breaking machine in accordance with the present invention, press-breaking of the glass plate along the cut line by the pressing surface is effected with respect to the glass plate outside the region, surrounded by the cut line, of the glass plate deflected by the glass plate receiving surface disposed above the supporting surface of the supporting mechanism, with the result that it is possible to avoid collision between the bend-broken cullet and the bend-broken surface of the glass plate as a product after press-breaking, and eliminate the occurrence of chipping or the like on the bend-broken surface of the glass plate as a product after press-breaking.

In a preferred example in accordance with the present invention, the glass plate receiving device may include a raising and lowering means for the glass plate receiving surface which, in the press-breaking of the glass plate along the cut line by the pressing surface of the press-breaking device, moves the glass plate receiving surface toward the flexible member so as to cause a deflection in the glass plate between the cut line on the glass plate and a predetermined pressing area of the glass plate to be pressed by the pressing surface, before pressing of the predetermined pressing area of the glass plate to be pressed by the pressing surface. In the present invention, the glass plate receiving surface may be constantly disposed above the supporting surface of the supporting mechanism irrespective of press-breaking of the glass plate along the cut line by the pressing surface, but if such raising and lowering means is provided, an upwardly oriented deflection can be caused in the glass plate in the press-breaking of the glass plate along the cut line, with the result that press-breaking can be executed reliably along the cut line on the glass plate by the pressing surface of the press-breaking device disposed above the glass plate. Moreover, it is possible to avoid unnecessary pressing of the glass plate receiving surface against the flexible member, so that damage to the flexible member can be reduced. The amount by which the glass plate receiving surface is disposed above the supporting surface of the supporting mechanism, or the amount of movement by which the glass plate receiving surface is directed toward the flexible member by the raising and lowering means, is determined by the size, thickness, bend-breaking width (cullet width), and the like of the glass plate. In a preferred example, this amount is 1 mm to 5 mm or thereabouts, but the invention is not limited to the same.

In the present invention, in a preferred example, the first moving device includes a moving mechanism for moving the glass plate receiving surface in one direction and in another direction intersecting the one direction, within a plane which is parallel to the surface of the glass plate, and the second moving device includes a moving mechanism for moving the pressing surface in one direction and in another direction intersecting the one direction, within a plane which is parallel to the surface of the glass plate.

In still another example of the present invention, the flexible member has an endless belt, the machine for bend-breaking a glass plate further comprising a means for imparting tension to the endless belt and a traveling means for causing the endless belt to travel.

In the present invention, the glass plate receiving surface in a preferred example has a flat surface for receiving the lower surface of the glass plate by means of the flexible member, in connection with a cutter wheel in the formation of cut lines including an end cut line, and such a flat surface may be a circular shape, an elliptical shape, a triangular shape, or a further polygonal shape in terms of an outer shape thereof.

Meanwhile, in the present invention, the pressing surface in a preferred example has a flat surface which is capable of pressing the upper surface of the glass plate.

As glass plates to be bend-broken by the bend-breaking machine of the present invention, it is possible to cite, by way of example, window glass plates for general structures, glass plates for furniture, and glass plates for automobiles, such as front glass, rear glass, and side glass, as well as glass plates for display screens in such as computers and mobile phones, but other glass plates can be also included.

As the flexible member in the present invention, a flexible endless belt, which is a flexible endless member, can be cited as a preferred example, but a flexible ended sheet may be alternatively used.

Advantages of the Invention

According to the present invention, it is possible to provide a glass plate bend-breaking machine which does not cause chipping or the like on the bend-broken surface of the glass plate as a product after press-breaking.

MODE FOR CARRYING OUT THE INVENTION

Hereafter, a more detailed description will be given of the present invention with reference to the embodiment shown in the drawings. The above-described aspects and other aspects of the present invention will become apparent therefrom. It should be noted that the present invention is not limited to the embodiment.

In FIGS. 1 to 7, a glass plate bend-breaking machine 1 in accordance with this embodiment is comprised of: a flexible endless belt 3 serving as a flexible member on which a glass plate 2 is placed; a supporting member 4 for supporting a peripheral portion of an upper side portion of the endless belt 3 from a lower surface side thereof; a plurality of, in this embodiment two, glass plate receiving devices 7 and 7a which respectively have glass plate receiving surfaces 6 and 6a for receiving the glass plate 2 from a lower surface side of the glass plate 2 by means of the endless belt 3 inside a region 5 surrounded by the supporting member 4, and which are disposed below the upper side portion of the endless belt 3; moving devices 8 and 8a for moving the glass plate receiving devices 7 and 7a respectively having the glass plate receiving surfaces 6 and 6a in an X direction, which is one direction within a plane parallel to the surface of the glass plate 2, i.e., within a horizontal plane in this embodiment, and in another direction perpendicular to the X direction, i.e., in a Y direction perpendicular to the X direction in this embodiment; a plurality of, in this embodiment two, press-breaking devices 9 and 9a disposed above the upper side portion of the endless belt 3; moving devices 10 and 10a for respectively moving the press-breaking devices 9 and 9a in the X direction, which is one direction within the horizontal plane and in another direction perpendicular to the X direction, i.e., in the Y direction perpendicular to the X direction in this embodiment; a carrying-in and carrying-out means 11 for carrying the glass plate 2 to be subjected to bend-breaking into the region 5 surrounded by the supporting member 4, and for carrying the glass plate 2 subjected to bend-breaking out of the region 5 surrounded by the supporting member 4; a tension imparting means 12 for imparting tension to the endless belt 3; a traveling device 13 for causing the endless belt 3 to travel in an A direction in the X direction; a supporting mechanism 15 having an upper surface 51 serving as a supporting surface for supporting the glass plate 2 by means of the endless belt 3 at a central portion of the lower surface of the glass plate 2; and a frame 16.

Both glass plate receiving devices 7 and 7a, both moving devices 8 and 8a, both press-breaking devices 9 and 9a, and both moving devices 10 and 10a are respectively constructed identically, a description will be given below of only the glass plate receiving device 7, the moving device 8, the press-breaking device 9, and the moving device 10 except for especially necessary cases, and corresponding devices will be only illustrated by attaching a to the same reference numerals.

The endless belt 3 is trained around a driving drum 17, a driven drum 18, and freely rotating drums 19 and 20.

The supporting member 4 formed of a hollow rectangular member is supported by a base 23 of the frame 16 by means of a bracket 21 and an intermediate base 22 of the frame 16. The supporting member 4 may be formed of a plate-shaped member instead of the hollow rectangular member. In short, it suffices if the supporting member 4 is capable of supporting the upper side portion of the endless belt 3 from the lower surface side thereof and of ensuring that the upper side portion of the endless belt 3 does not sag to an extremely degree. Therefore, the supporting member 4 may be omitted insofar as tension can be imparted to the endless belt 3 in a desired manner to ensure that the upper side portion of the endless belt 3 does not sag to an extremely degree. In addition, if the driving drum 17 and the driven drum 18 are provided as in this embodiment, the driving drum 17 and the driven drum 18 may be made to function as parts of the supporting member 4, and portions in the supporting member 4 which extend in parallel to the driving drum 17 and the driven drum 18 may be omitted.

Figure 1:
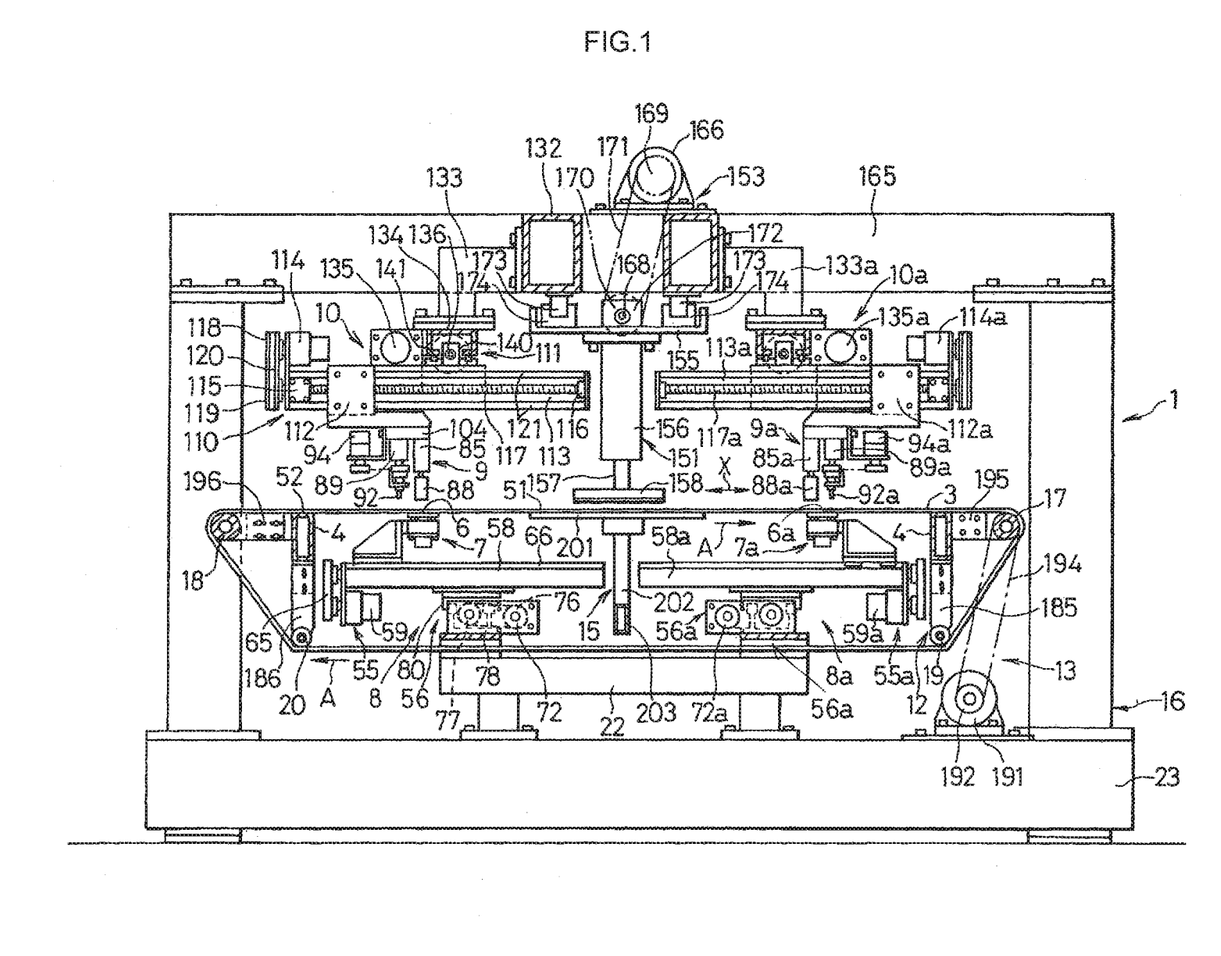
FIG. 1 is an explanatory side elevational view of a preferred embodiment of the present invention.
Figure 2:
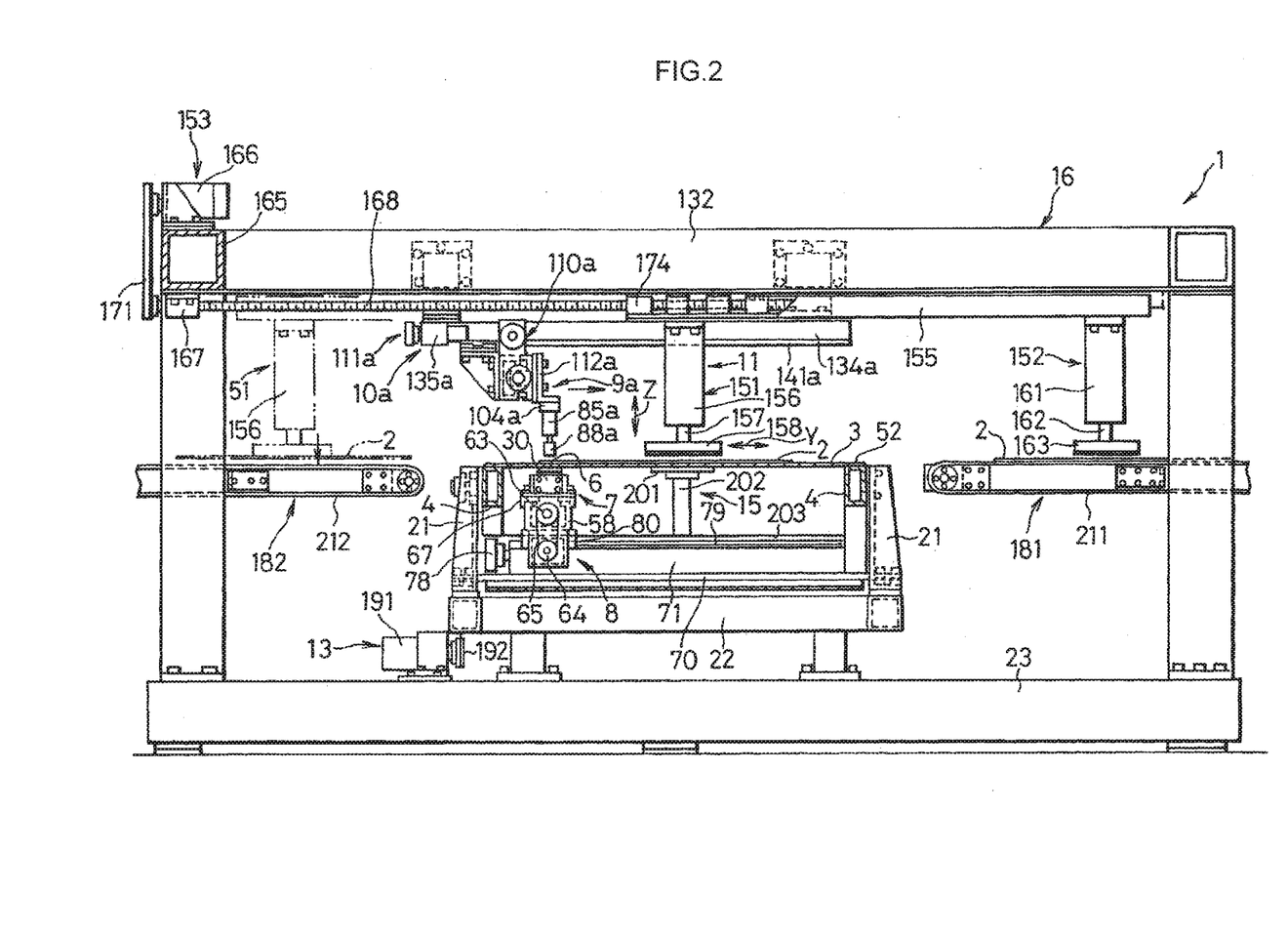
FIG. 2 is an explanatory front elevational view of the embodiment shown in FIG. 1.
Figure 3:
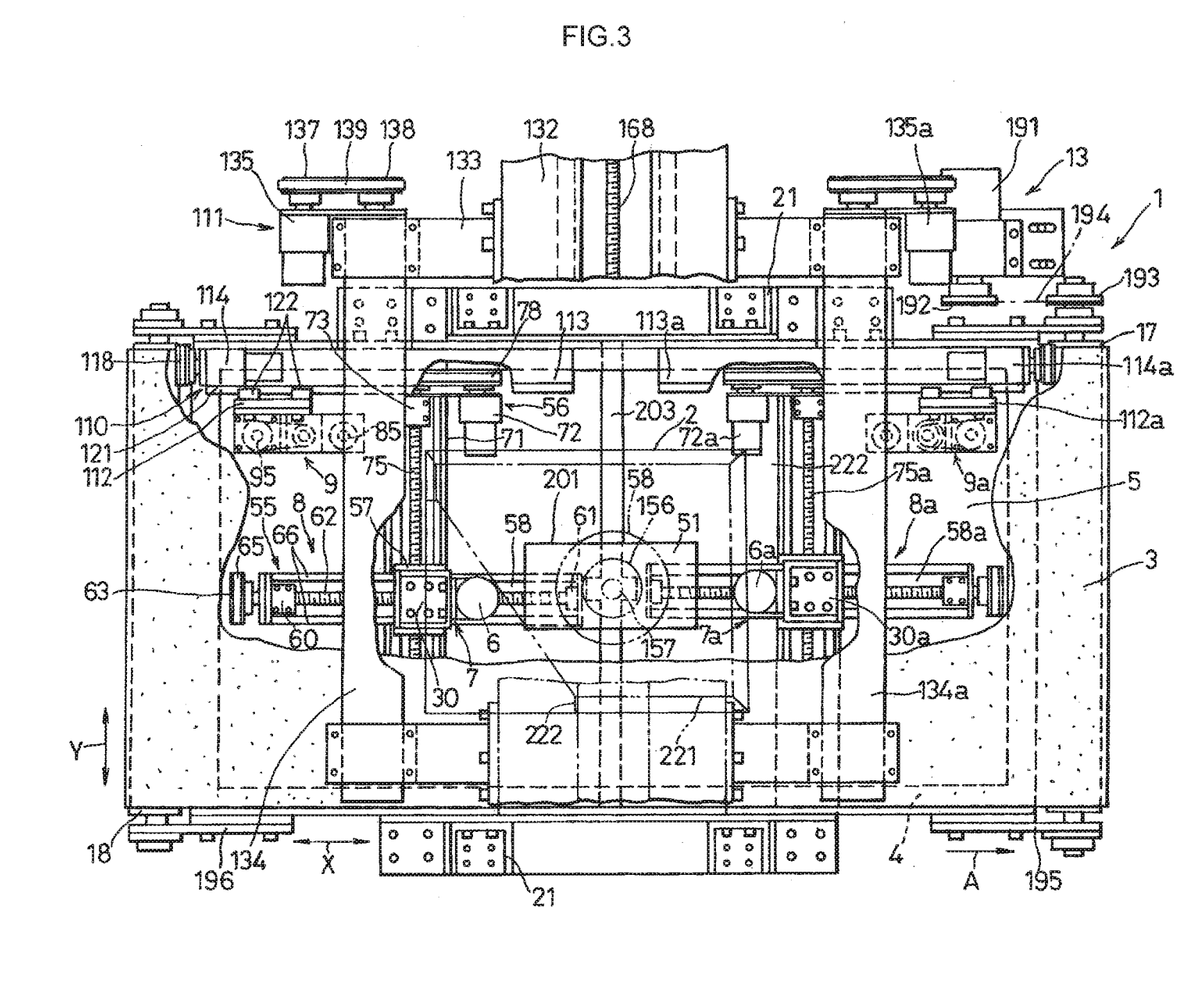
FIG. 3 is an explanatory plan view in which an endless belt, a supporting member, and the like are partly broken away in the embodiment shown in FIG. 1.
Figure 4:
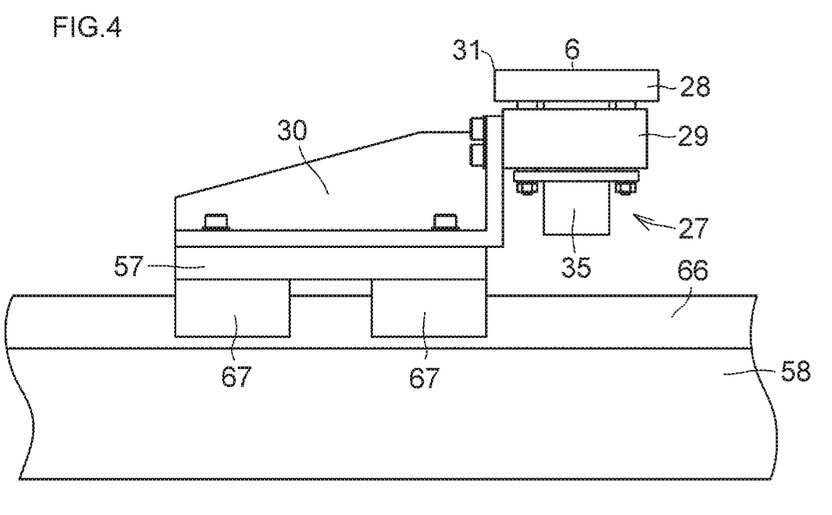
FIG. 4 is an explanatory detailed side elevational view of a glass plate receiving device in the embodiment shown in FIG. 1.
Figure 5:
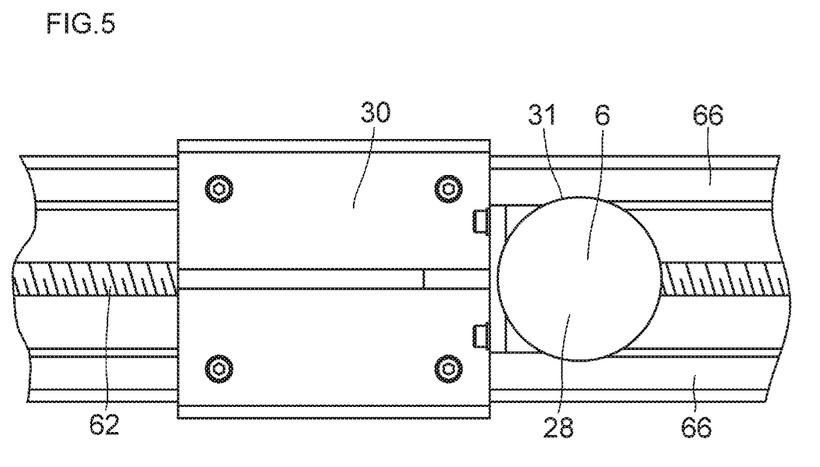
FIG. 5 is an explanatory detailed plan view of the glass plate receiving device in the embodiment shown in FIG. 1.

The glass plate receiving device 7 includes a raising and lowering means 27 for the glass plate receiving surface 6 which raises by 1 mm to 5 mm or thereabouts the glass plate receiving surface 6 in contact with the lower surface of the upper side portion of the endless belt 3, and which, after raising, lowers the glass plate receiving surface 6 to an original position thereof; a movable receiving member 28 having the glass plate receiving surface 6 formed on one end surface thereof; a supporting member 29 on which the movable receiving member 28 is mounted so as to be vertically movable; and a base 30 on which the supporting member 29 is mounted. The raising and lowering means 27 has a cylinder unit 35 which is mounted on the supporting member 29 and has a piston rod which is movably passed by means of the supporting member 29 and is connected to the movable receiving member 28. The cylinder unit 35 may be constituted by an air cylinder or may be a hydraulic cylinder and is adapted to raise and lower the movable receiving member 28 by an operation thereof by means of a piston rod.

The flat glass plate receiving surface 6, which has a circular outer contour 31 and extends parallel to the lower surface of the glass plate 2, when not raised by the raising and lowering means 27, is disposed parallel to the upper surface 51 of the supporting mechanism 15 and an upper surface 52 serving as the supporting surface of the supporting member 4 and at the same height as or 1 mm to 5 mm higher than the upper surface 51 and the upper surface 52.

The moving device 8 is constituted by an X-direction moving mechanism 55 and a Y-direction moving mechanism 56.

The X-direction moving mechanism 55 includes: an X-direction linearly moving base 57 on which the base 30 of the glass plate receiving device 7 is mounted; an electric motor 59 attached to a horizontal member 58; a threaded shaft 62 supported rotatably by the horizontal member 58 by means of bearings 60 and 61; pulleys 63 and 64, which are respectively secured to an output rotating shaft of the electric motor 59 and one end of the threaded shaft 62, as well as a belt 65 trained between the pulleys 63 and 64, so as to transmit the rotation of the output rotating shaft of the electric motor 59 to the threaded shaft 62; a nut (not shown) threadedly engaged with the threaded shaft 62 and secured by being fixed to a lower surface of the linearly moving base 57; a pair of rails 66 formed on the horizontal member 58; and a slider 67 fitted slidably to the pair of rails 66 and secured by being attached to the lower surface of the linearly moving base 57.

The linearly moving base 57 is adapted to move linearly in the X direction while being guided by the pair of rails 66 when the threaded shaft 62 is rotated by means of the pulleys 63 and 64 and the belt 65 as the electric motor 59 is operated to rotate the output rotating shaft thereof.

The Y-direction moving mechanism 56 is constructed in substantially the same way as the X-direction moving mechanism 55, and includes: the horizontal member 58 serving as a Y-direction linearly moving base; a horizontal member 71 fixedly mounted on top of the intermediate base 22 by means of a supporting member 70, the bracket 21, and the like; an electric motor 72 attached to the horizontal member 71; a threaded shaft 75 supported rotatably by the horizontal member 71 by means of bearings 73 and 74; pulleys 76 and 77, which are respectively secured to an output rotating shaft of the electric motor 72 and one end of the threaded shaft 75, as well as a belt 78 trained between the pulleys 76 and 77, so as to transmit the rotation of the output rotating shaft of the electric motor 72 to the threaded shaft 75; a nut (not shown) threadedly engaged with the threaded shaft 75 and secured by being fixed to a lower surface of the horizontal member 58; a pair of rails 79 formed on the horizontal member 71; and a slider 80 fitted slidably to the pair of rails 79 and secured by being attached to the lower surface of the horizontal member 58.

The horizontal member 58 is adapted to move linearly in the Y direction while being guided by the pair of rails 79 when the threaded shaft 75 is rotated by means of the pulleys 76 and 77 and the belt 78 as the electric motor 72 is operated to rotate the output rotating shaft thereof. In addition, as the horizontal member 58 is moved linearly in the Y direction, the linearly moving base 57 is similarly moved linearly in the Y direction.

Figure 7:
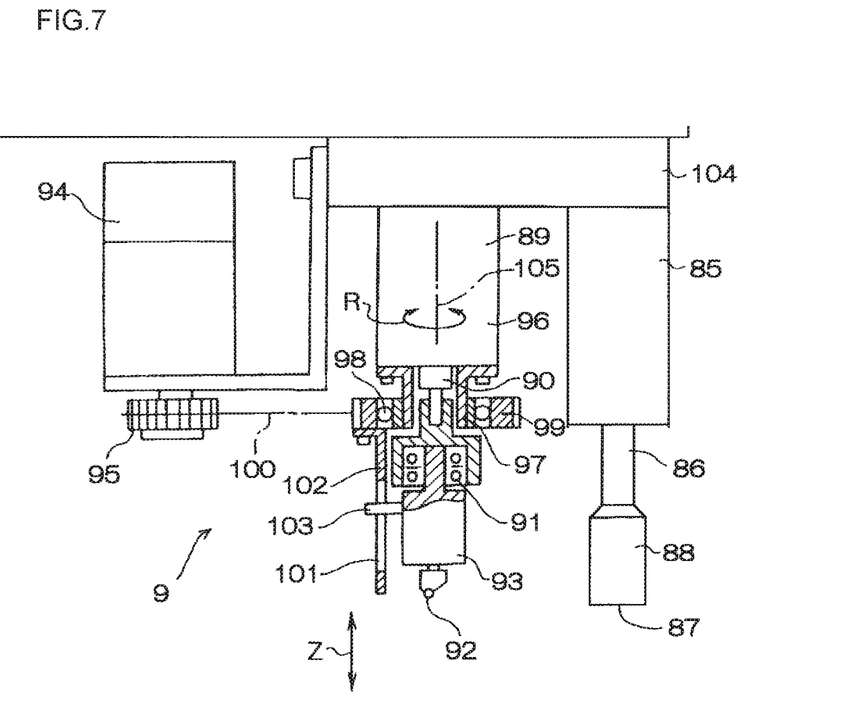
FIG. 7 is a detailed side elevational view of a press-breaking device in the embodiment shown in FIG. 1.

The press-breaking device 9 includes: an air cylinder unit 85; a push rod 88 attached to a piston rod 86 of the air cylinder unit 85 and having a flat pressing surface 87 on a lower surface thereof; an air cylinder unit 89; a cutter block 93 attached to a piston rod 90 of the air cylinder unit 89 by means of a bearing mechanism 91 and having a cutter wheel 92 at a tip thereof; an electric motor 94; a pulley or gear 95 attached to an output rotating shaft of the electric motor 94; a bearing mechanism 98 attached to a cylinder tube 96 of the air cylinder unit 89 by means of a bracket 97; a pulley or gear 99 attached to the bearing mechanism 98; a timing belt or chain 100 trained between the gear 95 and the gear 99; an engaging member 102 which is attached to the gear 99 and in which a slit 101 is formed; an engaging piece 103 having one end portion disposed in the slit 101 and the other end portion attached to the cutter block 93; and a base 104 on which the air cylinder units 85 and 89 and the electric motor 94 are mounted.

In the press-breaking device 9, as the air cylinder unit 85 is actuated to extend or retract the piston rod 86, the push rod 88 is moved in the vertical direction, i.e., in a Z direction; as the air cylinder unit 89 is actuated to extend or retract the piston rod 90, the cutter wheel 92 is moved in the Z direction; and as the gear 95 is rotated by the operation of the electric motor 94 to rotate the gear 99 by means of the chain 100, both the engaging member 102 and the engaging piece 103 engaging therewith at the slit 101 thereof are rotated about an axis 105 of the piston rod 90 in an R direction. The cutter wheel 92 is similarly rotated about the axis 105 in the R direction by this rotation, and an edge thereof is directed in the direction in which a cut line is formed.

The moving device 10 is constituted by an X-direction moving mechanism 110 and a Y-direction moving mechanism 111.

The X-direction moving mechanism 110 includes: an X-direction linearly moving base 112 on which the base 104 of the press-breaking device 9 is mounted; an electric motor 114 attached to a horizontal member 113; a threaded shaft 117 supported rotatably by the horizontal member 113 by means of bearings 115 and 116; pulleys 118 and 119, which are respectively secured to an output rotating shaft of the electric motor 114 and one end of the threaded shaft 117, as well as a belt 120 trained between the pulleys 118 and 119, so as to transmit the rotation of the output rotating shaft of the electric motor 114 to the threaded shaft 117; a nut (not shown) threadedly engaged with the threaded shaft 117 and secured by being fixed to a lower surface of the linearly moving base 112; a pair of rails 121 formed on the horizontal member 113; and a slider 122 fitted slidably to the pair of rails 121 and secured by being attached to the lower surface of the linearly moving base 112.

The linearly moving base 112 is adapted to move linearly in the X direction while being guided by the pair of rails 121 when the threaded shaft 117 is rotated by means of the pulleys 118 and 119 and the belt 120 as the electric motor 114 is operated to rotate the output rotating shaft thereof.

The Y-direction moving mechanism 111 is constructed in substantially the same way as the X-direction moving mechanism 110, and includes: the horizontal member 113 serving as a Y-direction linearly moving base; a horizontal member 134 fixedly mounted on an upper frame 132 of the frame 16 by means of a bracket 133 and the like; an electric motor 135 attached to the horizontal member 134; a threaded shaft 136 supported rotatably by the horizontal member 134 by means of bearings (not shown); pulleys 137 and 138, which are respectively secured to an output rotating shaft of the electric motor 135 and one end of the threaded shaft 136, as well as a belt 139 trained between the pulleys 137 and 138, so as to transmit the rotation of the output rotating shaft of the electric motor 135 to the threaded shaft 136; a nut 140 threadedly engaged with the threaded shaft 136 and secured by being fixed to the upper surface of the horizontal member 113; a pair of rails 141 laid on the horizontal member 134; and a slider (not shown) fitted slidably to the pair of rails 141 and secured by being attached to the upper surface of the horizontal member 113. The horizontal member 113 is suspended from and supported by means of the slider in such a manner as to be movable in the Y direction.

The horizontal member 113 is adapted to move linearly in the Y direction while being guided by the pair of rails 141 when the threaded shaft 136 is rotated by means of the pulleys 137 and 138 and the belt 139 as the electric motor 135 is operated to rotate the output rotating shaft thereof. In addition, as the horizontal member 113 is moved linearly in the Y direction, the linearly moving base 112 is similarly moved linearly in the Y direction.

The carrying-in and carrying-out means 11 includes: a lifting mechanism 151 for lifting up the glass plate 2 which is placed on the belt 3 and for which bend-breaking has been completed, and for clamping the glass plate 2, which is placed on the belt 3, in cooperation with the supporting mechanism 15 with the belt 3 interposed therebetween so as to fix the glass plate 2 onto the belt 3 during bend-breaking; a lifting mechanism 152 for placing the glass plate to be bend-broken onto the belt 3; and a reciprocating mechanism 153 for reciprocating the pair of lifting devices 151 and 152 in the Y direction.

The lifting mechanism 151 has an air cylinder unit 156 mounted on a movable base 155 as well as a vacuum suction device 158 attached to a distal end of a piston rod 157 of the air cylinder unit 156. As the air cylinder unit 156 is actuated to extend or retract the piston rod 157 thereof in the Z direction, the vacuum suction device 158 lifts up the glass plate 2 placed on the belt 3, or clamps the glass plate 2, which is placed on the belt 3, in cooperation with the supporting mechanism 15 with the belt 3 interposed therebetween so as to fix the glass plate 2 onto the belt 3.

The lifting mechanism 152 is formed in the same way as the lifting mechanism 151 and has an air cylinder unit 161 mounted on the movable base 155 common to the lifting mechanism 151 as well as a vacuum suction device 163 attached to a distal end of a piston rod 162 of the air cylinder unit 161. As the air cylinder unit 161 is actuated to lower the piston rod 162 thereof in the Z direction, the vacuum suction device 163 places the glass plate 2, which is being sucked, onto the belt 3.

The reciprocating mechanism 153 includes: the movable base 155; an electric motor 166 attached to an upper frame 165 of the frame 16; a threaded shaft 168 supported rotatably by the upper frame 132 of the frame 16 by means of a bearing 167; pulleys 169 and 170, which are respectively secured to an output rotating shaft of the electric motor 166 and one end of the threaded shaft 168, as well as a belt 171 trained between the pulleys 169 and 170, so as to transmit the rotation of the output rotating shaft of the electric motor 166 to the threaded shaft 168; a nut 172 threadedly engaged with the threaded shaft 168 and secured by being fixed to the upper surface of the movable base 155; a pair of rails 173 formed on the upper frame 132; and a slider 174 fitted slidably to the pair of rails 173 and secured by being attached to the upper surface of the movable base 155.

The movable base 155, which is suspended from and supported by the upper frame 132 movably in the Y direction by means of the slider 174, is adapted to reciprocate linearly in the Y direction while being guided by the pair of rails 173 when the threaded shaft 168 is rotated by means of the pulleys 169 and 170 and the belt 171 as the electric motor 166 is operated to rotate the output rotating shaft thereof.

As the reciprocating mechanism 153 is operated, the carrying-in and carrying-out means 11 causes the lifting devices 151 and 152 to reciprocate linearly in the Y direction. In this linear reciprocating motion, the lifting device 152 lifts up the glass plate 2 to be subjected to bend-breaking and placed on a conveying device 181 on the entrance side, carries it into the region 5 surrounded by the supporting member 4, and places it on the upper surface of the upper side portion of the endless belt 3, whereas the lifting device 151 carries the glass plate 2, subjected to bend-breaking and placed on the upper surface of the upper side portion of the endless belt 3, out of the region 5 surrounded by the supporting member 4, and places it on a conveying device 182 on the exit side.

The tension imparting means 12 has a pair of air cylinder units 185 and 186 supported by the bracket 21, and the piston rod of the air cylinder unit 185 rotatably supports the freely rotating drum 19, while the piston rod of the air cylinder unit 186 rotatably supports the freely rotating drum 20.

The tension imparting means 12 imparts tension to the endless belt 3 by means of the freely rotating drums 19 and 20 by means of the pneumatic resiliency of the air cylinder units 185 and 186, thereby tensioning the endless belt 3. The tension imparting means 12 may not be provided if the endless belt 3 can be tensioned as desired by the positional adjustment of the driving drum 17, the driven drum 18, and the freely rotating drums 19 and 20.

The traveling device 13 includes an electric motor 191 mounted on the base 23; the aforementioned driving drum 17 and driven drum 18; the freely rotating drums 19 and 20; and pulleys 192 and 193, which are respectively secured to an output rotating shaft of the electric motor 191 and a rotating shaft of the driving drum 17, as well as a belt 194 trained between the pulleys 192 and 193, so as to transmit the rotation of the output rotating shaft of the electric motor 191 to the rotating shaft of the driving drum 17. The driving drum 17 and the driven drum 18 are respectively attached rotatably to frames 195 and 196 which are supported by the intermediate base 22.

As the electric motor 191 is operated to rotate the output rotating shaft thereof, the traveling device 13 rotates the driving drum 17 by means of the pulley 192, the belt 194, and the pulley 193. As the driving drum 17 is rotated, the belt 3 is made to travel in, for example, the A direction, thereby allowing the belt 3 to convey cullet, obtained by bend-breaking on the belt 3, in the A direction and discharge the same.

The supporting mechanism 15 has a rectangular receiving plate 201 and a column 202 for supporting the receiving plate 201, and the column 202 is supported by the bracket 21 by means of a horizontal member 203.

The supporting mechanism 15 supports from below the glass plate 2, which is placed on the endless belt 3, by means of the endless belt 3 on the upper surface 51 of the receiving plate 201, and clamps the glass plate 2 in cooperation with the vacuum suction device 158 so as to fix it onto the belt 3.

The conveying device 181 on the entrance side has an endless belt 211 on which the glass plate 2 to be bend-broken is placed, as well as a traveling device (not shown) for causing the endless belt 211 to travel. The conveying device 181 accurately carries in the glass plate 2 to be bend-broken to a predetermined position by means of the traveling of the endless belt 211 based on the operation of the traveling device.

The conveying device 182 on the exit side has an endless belt 212 on which the glass plate 2 subjected to bend-breaking is placed, as well as a traveling device (not shown) for causing the endless belt 212 to travel. The conveying device 182 conveys the glass plate 2 subjected to bend-breaking, to an ensuing working process, e.g., a process for grinding and polishing bent-broken edges, by means of the traveling of the endless belt 212 based on the operation of the traveling device.

The glass plate bend-breaking machine 1 further comprises a controller including a microcomputer and the like, and the controller controls the operation of the electric motors, the air cylinder units, the vacuum suction devices, and the like by means of numerical control commands programmed in advance. Since such a controller itself is publicly known, and a detailed description thereof will be omitted.

The glass plate bend-breaking machine 1 performs the bend-breaking operation with respect to the glass plate 2 in the following manner.

First, the glass plate 2, on which predetermined bend-breaking lines (main cut lines) 221 have been scored thereon in advance as cut lines and which has rectangular outer edges, is disposed in an accurate position by the endless belt 211. Incidentally, such predetermined bend-breaking lines 221 may be formed by the glass plate bend-breaking machine 1 of this embodiment.

Upon completion of one bend-breaking, the respective vacuum suction devices 158 and 163 which have already been lowered by the actuation of the air cylinder units 156 and 161 are operated, and the already bend-broken glass plate 2 on the endless belt 3 is sucked by the vacuum suction device 158, while the glass plate 2 which is to be bend-broken next and placed on the endless belt 211 is sucked by the vacuum suction device 163. Subsequently, the air cylinder units 156 and 161 are operated, and the already bend-broken glass plate 2 on the endless belt 3 is lifted up by the vacuum suction device 158, while the glass plate 2 which is to be bend-broken and placed on the endless belt 211 is lifted up by the vacuum suction device 163.

After lifting up, the electric motor 166 of the reciprocating mechanism 153 is operated to reciprocate the movable base 155, and the already bend-broken glass plate 2 lifted up by the vacuum suction device 158 is carried onto the endless belt 212 out of the region 5 surrounded by the supporting member 4, while the glass plate 2 which is to be bend-broken from now and lifted up by the vacuum suction device 163 is carried onto the endless belt 3 and into the region 5 surrounded by the supporting member 4.

During this carrying-out and carrying-in operation, when the electric motor 191 is operated to cause the endless belt 3 to travel in the A direction in the state in which the glass plate 2 is lifted up, the bent-broken cullet remaining on the upper side portion of the endless belt 3 is conveyed in the A direction in conjunction with the traveling of the endless belt 3, and is discharged. After the discharge of the bend-broken cullet, the operation of the electric motor 191 is stopped to stop the traveling of the endless belt 3 in the A direction.

After carrying-in and carrying-out, the air cylinder units 156 and 161 are actuated again to lower the vacuum suction devices 158 and 163. After the vacuum suction devices 158 and 163 are lowered to predetermined positions, the sucking operation of the vacuum suction devices 158 and 163 is stopped, and the bent-broken glass plate 2 is placed on the endless belt 212 by the vacuum suction device 158, while the glass plate 2 to be bend-broken from now is placed on the endless belt 3 by the vacuum suction device 163. Subsequently, the air cylinder units 156 and 161 are reversely actuated to raise the vacuum suction devices 158 and 163. Further, the electric motor 166 of the reciprocating mechanism 153 is reversely operated to cause the movable base 155 to undergo returning motion, and the vacuum suction device 163 is moved to above the endless belt 211, while the vacuum suction device 158 is moved to above the endless belt 3.

During the reciprocating motion of the vacuum suction devices 158 and 163, the glass plate 2 to be bend-broken next is carried in to the predetermined position by the operation of the endless belt 211.

Upon return of the vacuum suction devices 158 and 163 to their original positions, the air cylinder units 156 and 161 are actuated again to lower the vacuum suction devices 158 and 163. After the vacuum suction devices 158 and 163 are lowered to their predetermined positions, the glass plate 2 placed on the upper side portion of the endless belt 3 by the vacuum suction device 158 is pressed against the endless belt 3 by means of the pneumatic resiliency based on the air cylinder unit 156, while the glass plate 2 placed on the endless belt 211 by the vacuum suction device 163 is pressed against the endless belt 211 by means of the pneumatic resiliency based on the air cylinder unit 161.

As a result, the glass plate 2 placed on the upper side portion of the endless belt 3 is clamped at a central portion thereof by the vacuum suction device 158 and the receiving plate 201 with the endless belt 3 interposed therebetween, and is securely held and fixed on the upper side portion of the endless belt 3.

Subsequently, the electric motors 59 and 59a as well as 72 and 72a are operated to move the glass plate receiving devices 7 and 7a in the X and Y directions, so that the glass receiving surfaces 6 and 6a will be disposed below the cutter wheels 92 and 92a. At the same time, the electric motors 114 and 114a as well as 135 and 135a are operated to move the press-breaking devices 9 and 9a in the X and Y directions, so that the cutter wheels 92 and 92a are moved in the radial direction with the predetermined bend-breaking lines 221 set as starting points. When the cutter wheels 92 and 92a are moved from the predetermined bend-breaking lines 221, the air cylinder units 89 and 89a are concurrently actuated to cause the cutter wheels 92 and 92a to abut against the glass plate 2, thereby forming end cut lines (auxiliary cut lines) 222 as cut lines on the glass plate 2 by means of the cutter wheels 92 and 92a.

During the formation of the end cut lines 222, the electric motors 94 and 94a are operated to cause the edges of the cutter wheels 92 and 92a to be directed in the direction in which the end cut lines are formed. In addition, during the formation of the end cut lines, the push rods 88 and 88a remain raised without coming into contact with the glass plate 2.

After one end cut line 222 is thus formed, the press-breaking devices 9 and 9a and the glass plate receiving devices 7 and 7a are moved to ensuing end-cut-line forming positions, and the cutter wheels 92 and 92a respectively effect the end-cut-line formation within the region 5. During the end-cut-line formation, the glass plate receiving devices 7 and 7a are moved in correspondence with the movement of the cutter wheels 92 and 92a so that the glass plate receiving surfaces 6 and 6a receive the pressing force of the cutter wheels 92 and 92a by means of the glass plate 2 and the belt 3.

Upon completion of the end-cut-line formation, the air cylinder units 89 and 89a are then actuated to raise the cutter wheels 92 and 92a, thereby canceling the contact between the cutter wheels 92 and 92a and the glass plate 2.

Figure 8:
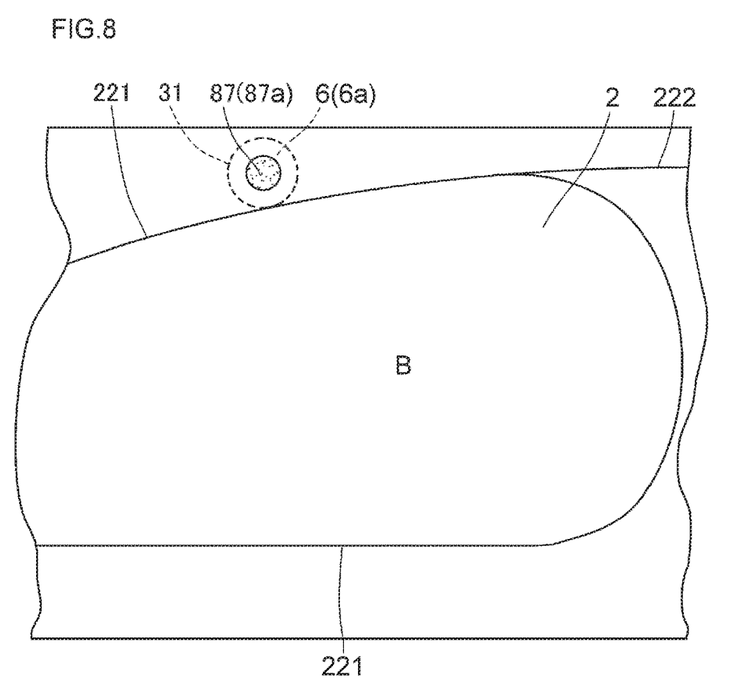
FIG. 8 is a diagram for explaining the operation in the embodiment shown in FIG. 1.

Further, the electric motors 59 and 59a as well as 72 and 72a are operated to move the glass plate receiving devices 7 and 7a in the X and Y directions, such that, as shown in FIG. 8, each of the glass plate receiving surfaces 6 and 6a is disposed at a position outside a region B surrounded by the predetermined bend-breaking lines 221, i.e., the cut lines on the glass plate 2, and at such a position that the circular outer contour 31 of each of the glass plate receiving surfaces 6 and 6a circumscribes the predetermined bend-breaking line 221 on the glass plate 2 in a plan view. Similarly, the electric motors 114 and 114a as well as 135 and 135a are operated to move the press-breaking devices 9 and 9a in the X and Y directions, thereby allowing each of the pressing surfaces 87 and 87a of the push rods 88 and 88a to be disposed above each of the glass plate receiving surfaces 6 and 6a.

Figure 6:
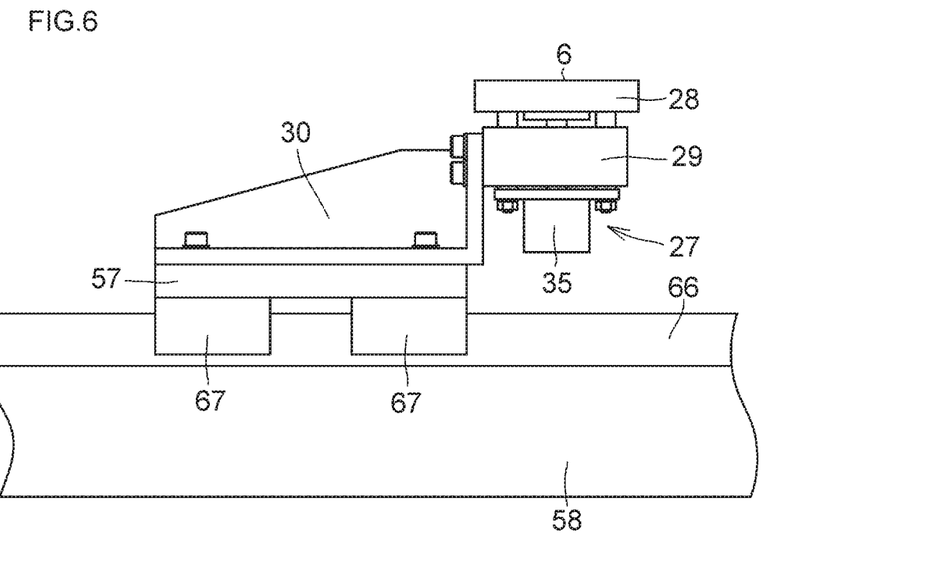
FIG. 6 is a diagram for explaining the operation of the glass plate receiving device in the embodiment shown in FIG. 1.

In a state in which the glass plate receiving surface 6a and the pressing surface 87a are opposed to each other in the Z direction as shown in FIG. 8, the cylinder units 35 and 35a are actuated as shown in FIG. 6 so as to raise the glass plate receiving surfaces 6 and 6a by 1 mm to 5 mm or thereabouts by means of the movable receiving members 28 and 28a, thereby causing an upwardly oriented deflection substantially starting from the predetermined bend-breaking line 221 to occur in that part of the glass plate 2 which corresponds to each of the glass plate receiving surfaces 6 and 6a and is located between the predetermined bend-breaking line 221 on the glass plate 2 and a predetermined pressing area of the glass plate 2 to be pressed by each of the pressing surfaces 87 and 87a. In the state in which such a deflection has been caused, the air cylinder units 85 and 85a are actuated to lower the push rods 88 and 88a, thereby causing the push rods 88 and 88a to abut against the glass plate 2 outside the region B surrounded by the predetermined bend-breaking lines 221, press-break the glass plate 2 along the predetermined bend-breaking line 221, and press-break that part of the glass plate 2 located outside the region B and between the end cut lines 222 out of the glass plate 2 inside the region B. As the glass plate receiving surfaces 6 and 6a and the pressing surfaces 87 and 87a are returned to their original positions by the lowering of the glass plate receiving surfaces 6 and 6a after press-bending and the raising of the push rods 88 and 88a, the glass plate 2 outside the region B is discharged as bend-broken cullet by the traveling in the A direction of the endless belt 3. The foregoing operation is effected with respect to the respective predetermined pressing areas between the end cut lines 222.

When the above-described press-breaking is finished, and the glass plate 2 bend-broken along the predetermined bend-breaking lines 221 is obtained, the foregoing operation is repeated.

The bend-breaking machine 1 for bend-breaking the glass plate 2 is comprised of: the endless belt 211 serving as a flexible member on which the glass plate 2 with the predetermined bend-breaking lines 221 formed thereon as cut lines is placed; the supporting mechanism 15 for supporting the glass plate 2 from a lower surface of the glass plate 2 by means of the endless belt 211; the glass plate receiving devices 7 and 7a for receiving the glass plate 2 from the lower surface of the glass plate 2 by means of the endless belt 211; the moving devices 8 and 8a for respectively moving the glass plate receiving devices 7 and 7a; the press-breaking devices 9 and 9a for pressing the glass plate 2 from the upper surface of the glass plate 2 to press-break the glass plate 2 along the predetermined bend-breaking lines 221; and the moving devices 10 and 10a for respectively moving the press-breaking devices 9 and 9a. Each of the moving devices 8 and 8a is adapted to move each of the glass plate receiving devices 7 and 7a such that, at the time of the press-breaking of the glass plate 2 by the press-breaking devices 9 and 9a, the glass plate 2 can be received from the lower surface thereof by means of the endless belt 211 at a position outside the region of the glass plate 2 surrounded in a plan view by the predetermined bend-breaking lines 221. Each of the moving devices 10 and 10a is adapted to move each of the press-breaking devices 9 and 9a such that, at the time of the press-breaking of the glass plate 2 by the press-breaking devices 9 and 9a, the glass plate 2 can be pressed from the upper surface thereof at the position outside the region of the glass plate 2 surrounded in a plan view by the predetermined bend-breaking lines 221 in correspondence with the movement of each of the glass plate receiving devices 7 and 7a. Namely, more specifically, the bend-breaking machine 1 for bend-breaking the glass plate 2 is comprised of: the endless belt 3 on which the glass plate 2 with the predetermined bend-breaking lines 221 and the end cut lines 222 formed thereon is placed; the supporting mechanism 15 having the upper surface 51 for supporting the glass plate 2 at a central portion of the lower surface of the glass plate 2 by means of the endless belt 3; the glass plate receiving devices 7 and 7a which are disposed below the endless belt 3 and respectively have the glass plate receiving surfaces 6 and 6a for receiving the glass plate 2 from the lower surface of the glass plate 2 by means of that endless belt 3; the moving devices 8 and 8a for moving the glass plate receiving devices 7 and 7a; the press-breaking devices 9 and 9a which are disposed above the endless belt 3 and have the pressing surfaces 87 and 87a for causing the glass plate 2 with the predetermined bend-breaking lines 221 and the end cut lines 222 formed thereon to be press-broken along the predetermined bend-breaking lines 221 and the end cut lines 222; and the moving devices 10 and 10a for moving the press-breaking devices 9 and 9a. Each of the moving devices 8 and 8a is adapted to move each of the glass plate receiving devices 7 and 7a such that, at the time of the press-breaking of the glass plate 2 by each of the pressing surfaces 87 and 87a, each of the glass plate receiving surfaces 6 and 6a is disposed at a position outside the region B of the glass plate 2 surrounded in a plan view by the predetermined bend-breaking lines 221. Each of the moving devices 10 and 10a is adapted to move each of the press-breaking devices such that, at the time of the press-breaking of the glass plate 2 by each of the pressing surfaces 87 and 87a, each of the pressing surfaces 87 and 87a is disposed at the position outside the region B of the glass plate 2 surrounded in a plan view by the predetermined bend-breaking lines 221 in correspondence with each of the glass plate receiving surfaces 6 and 6a. The press-breaking of the glass plate 2 along the predetermined bend-breaking lines 221 and the end cut lines 222 by the pressing surfaces 87 and 87a is adapted to be effected with respect to the glass plate 2 outside the region B, surrounded by the predetermined bend-breaking lines 221, of the glass plate 2 deflected by each of the glass plate receiving surfaces 6 and 6a disposed above the upper surface 51 of the supporting mechanism 15. In such a bend-breaking machine 1 for bend-breaking the glass plate 2, at the time of the press-breaking of the glass plate 2 by each of the pressing surfaces 87 and 87a, each of the glass plate receiving devices 7 and 7a is adapted to be moved by each of the moving devices 8 and 8a such that each of the glass plate receiving surfaces 6 and 6a is disposed outside the region B in a plan view, with the result that it is possible to avoid collision between the bend-broken cullet outside the region B and the bend-broken face of the glass plate 2 in the region B and eliminate the occurrence of chips or the like at the bend-broken face of the glass plate 2 as a post-press-broken product.

It should be noted that, in addition to the end-cut-line formation, the predetermined bend-breaking line 211 may be formed by the press-breaking devices 9 and 9a of the glass plate bend-breaking machine 1. In addition, with the glass plate bend-breaking machine 1, press-breaking alone may be effected, and the end-cut-line formation may be effected in a preceding process, in which case the cutter wheels 92 and 92a and the like may be omitted.

Further, although in the above-described embodiment there are provided the pair of glass plate receiving devices 7 and 7a, the pair of moving devices 8 and 8a, the pair of press-breaking devices 9 and 9a, and the pair of moving devices 10 and 10a, and the end-cut-line formation and press-breaking with respect to the glass plate 2 are effected in an apportioned manner, the glass plate bend-breaking machine may be alternatively constructed by being provided with one device, respectively, or by providing three or more devices, respectively.

Figure 9:
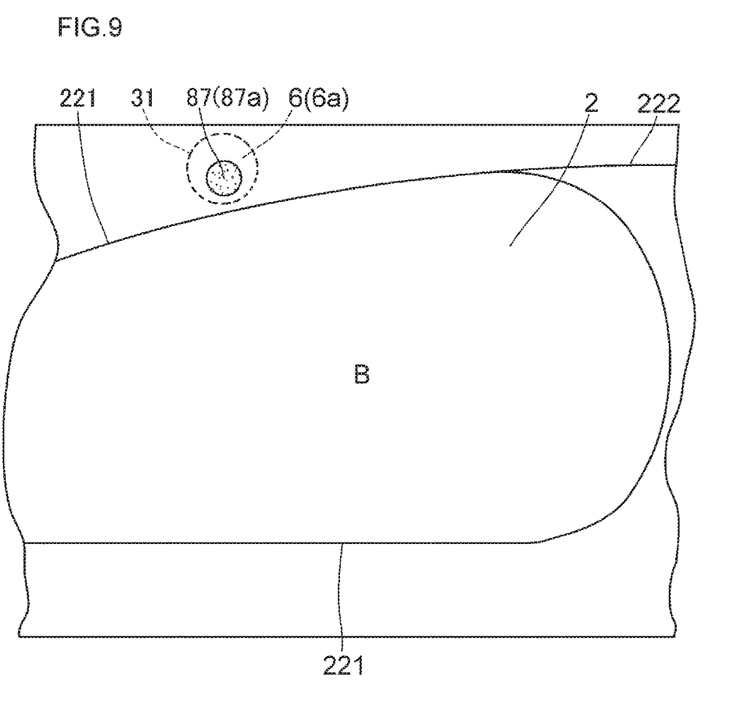
FIG. 9 is a diagram for explaining the operation in the embodiment shown in FIG. 1.
Figure 10:
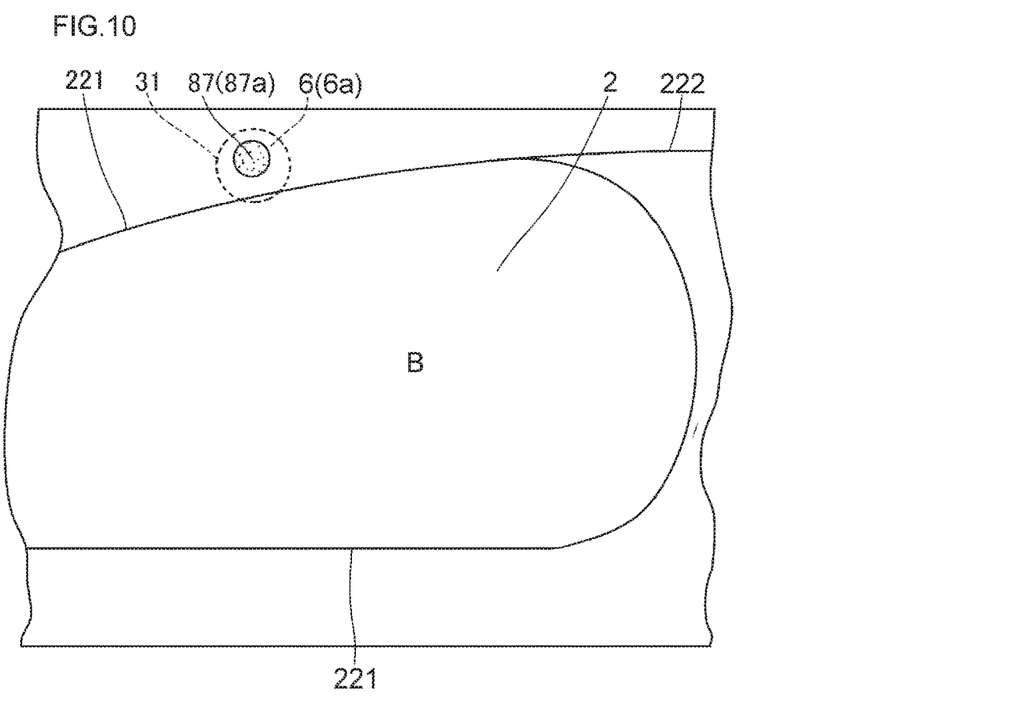
FIG. 10 is a diagram for explaining the operation in the embodiment shown in FIG. 1.

Furthermore, in the above-described embodiment, the electric motors 59 and 59a as well as 72 and 72a are operated to move the glass plate receiving devices 7 and 7a in the X and Y directions, such that, as shown in FIG. 8, each of the glass plate receiving surfaces 6 and 6a is disposed at such a position that the circular outer contour 31 thereof circumscribes the predetermined bend-breaking line 221 on the glass plate 2 in a plan view and at a position located outside the region B similarly in a plan view. Similarly, the electric motors 114 and 114a as well as 135 and 135a are operated to move the press-breaking devices 9 and 9a in the X and Y directions, so as to allow each of the pressing surfaces 87 and 87a of the push rods 88 and 88a to be disposed above each of the glass plate receiving surfaces 6 and 6a. Alternatively, however, bend-breaking may be executed as follows: The electric motors 59 and 59a as well as 72 and 72a are operated to move the glass plate receiving devices 7 and 7a in the X and Y directions, such that, as shown in FIG. 9, each of the glass plate receiving surfaces 6 and 6a is disposed at such a position that the circular outer contour 31 thereof is positioned on a slightly outer side of the predetermined bend-breaking line 221 on the glass plate 2 in a plan view and at a position located outside the region B similarly in a plan view, or such that, as shown in FIG. 10, each of the glass plate receiving surfaces 6 and 6a is disposed at such a position that the circular outer contour 31 thereof intersects the predetermined bend-breaking line 221 on the glass plate 2 in a plan view and that a major portion of each of the glass plate receiving surfaces 6 and 6a is positioned outside the region B. Similarly, the electric motors 114 and 114a as well as 135 and 135a are operated to move the press-breaking devices 9 and 9a in the X and Y directions, so as to allow each of the pressing surfaces 87 and 87a of the push rods 88 and 88a to be disposed above each of the glass plate receiving surfaces 6 and 6a. Furthermore, bend-breaking may be executed such that each of the pressing surfaces 87 and 87a of the push rods 88 and 88a is set away from above each of the glass plate receiving surfaces 6 and 6a, and such that each of the pressing surfaces 87 and 87a of the push rods 88 and 88a is positioned between the predetermined bend-breaking line 221 and each of the glass plate receiving surfaces 6 and 6a defined by the circular outer contour 31 in a plan view In addition, although, in the above-described embodiment, each of the glass plate receiving surfaces 6 and 6a is raised and lowered by each of the raising and lowering means 27 and 27a, the raising and lowering means 27 and 27a may not be provided, and the glass plate receiving surfaces 6 and 6a may be constantly disposed 1 mm to 5 mm or thereabouts above the upper surface 51.

Figure 11:
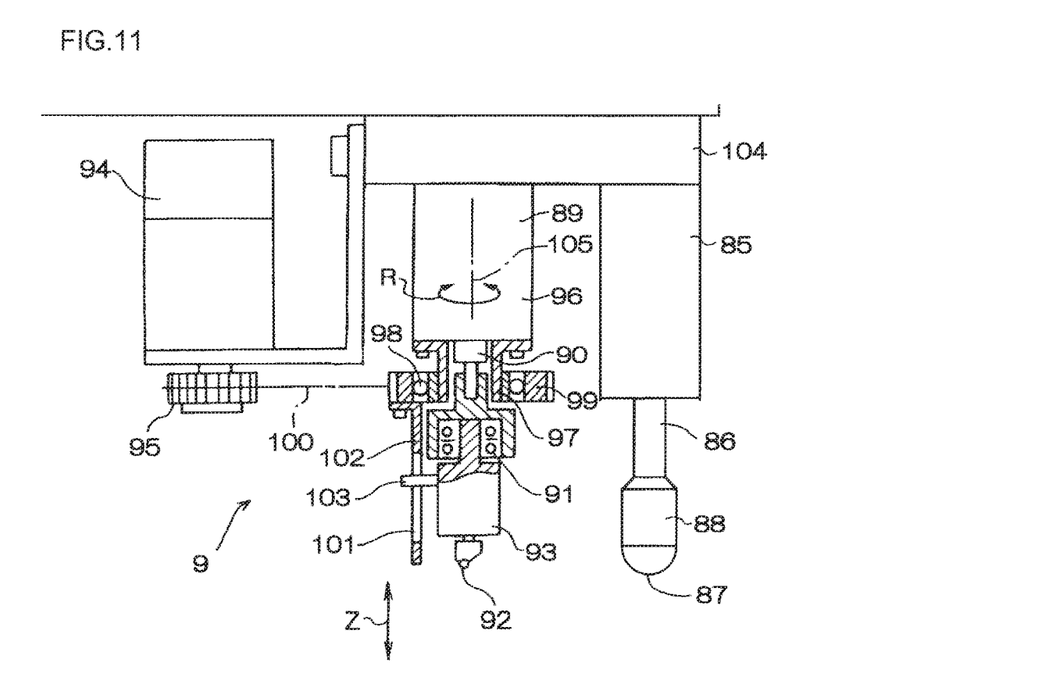
FIG. 11 is an explanatory diagram of a modification of a pressing surface in the embodiment shown in FIG. 1.
Figure 12:
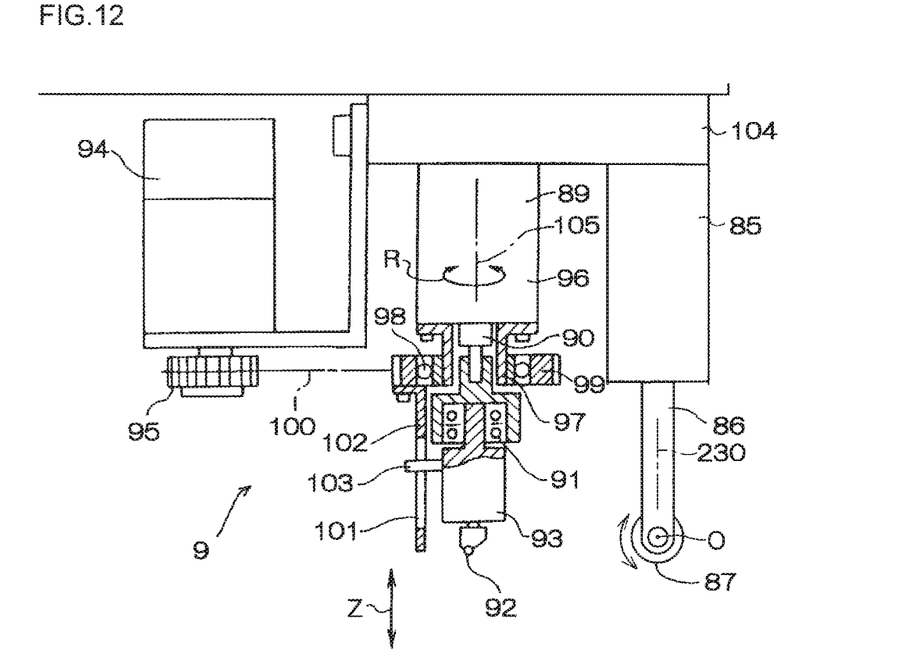
FIG. 12 is an explanatory diagram of another modification of the pressing surface in the embodiment shown in FIG. 1.

In the above-described embodiment, the pressing surface 87 is a flat circular planar surface, as shown in FIG. 7. However, the pressing surface 87 may be a partial spherical surface which does not rotate (fixed partial spherical surface) constituted by an outer peripheral surface of a partial sphere fixed to a lower end of the push rod 88, as shown in FIG. 11, or may be a rotatable cylindrical surface constituted by an outer peripheral surface of a cylindrical body such as a roller which is rotatably supported by the lower end of the piston rod 86 by means of a shaft, as shown in FIG. 12. Although not shown, the pressing surface 87 may be a rotatable spherical surface constituted by an outer peripheral surface of a spherical body which is rotatably supported by the lower end of the push rod 88. Although also not shown, the pressing surface 87 may be a cylindrical surface, a conical surface, or a truncated conical surface constituted by an outer peripheral surface of a cylindrical body, a conical body, or a truncated conical body fixed to the lower end of the push rod 88. Additionally, the pressing surface 87 may be, instead of the flat circular planar surface, a flat rectangular planar surface constituted by an outer peripheral surface of a prismatic body fixed to the lower end of the push rod 88. In a case where the pressing surface 87 is a rotatable cylindrical surface or a fixed cylindrical surface, it suffices if a rotating mechanism is provided for rotating the push rod 88 about an axis 230 of the push rod 88 or the axis 105 of the piston rod 90, so that the axis O of each of these cylindrical surfaces extends parallel to a tangent to the predetermined bend-breaking line 221 closest to the position on the upper surface of the glass plate 2 (predetermined pressing position) which is pressed by that cylindrical surface.

Figure 13:
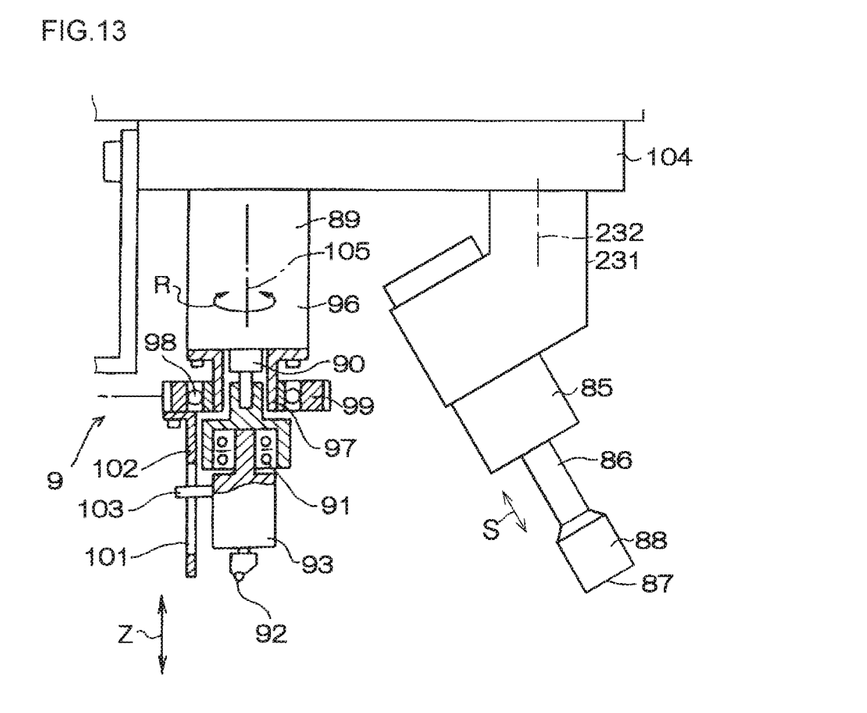
FIG. 13 is an explanatory diagram of a modification of the press-breaking device in the embodiment shown in FIG. 1.

In the above-described embodiment, the pressing surface 87 is abutted against the glass plate 2 by moving the push rod 88 in the Z direction by means of the extension and contraction of the piston rod 86, to thereby press-break the glass plate 2. Alternatively, however, as shown in FIG. 13, the push rod 88 may be advanced or retreated in an oblique direction S intersecting the Z direction by means of the extension and contraction of the piston rod 86 of the air cylinder unit 85 provided by being suspended from the base 104 by means of a suspending member 231, whereby the pressing surface 87 is abutted against the glass plate 2 by means of the extension of the piston rod 86, so as to press the glass plate 2 obliquely downward by the pressing surface 87 in such a manner as to kick out the glass plate 2 located outside the region B away from the glass plate 2 located inside the region B toward an outer edge of the glass plate 2, thereby press-breaking the glass plate 2. In this case as well, a rotating mechanism may be provided for rotating the air cylinder unit 85 about an axis 232 of the suspending member 231 or the axis 105 of the piston rod 90.

Figure 14:
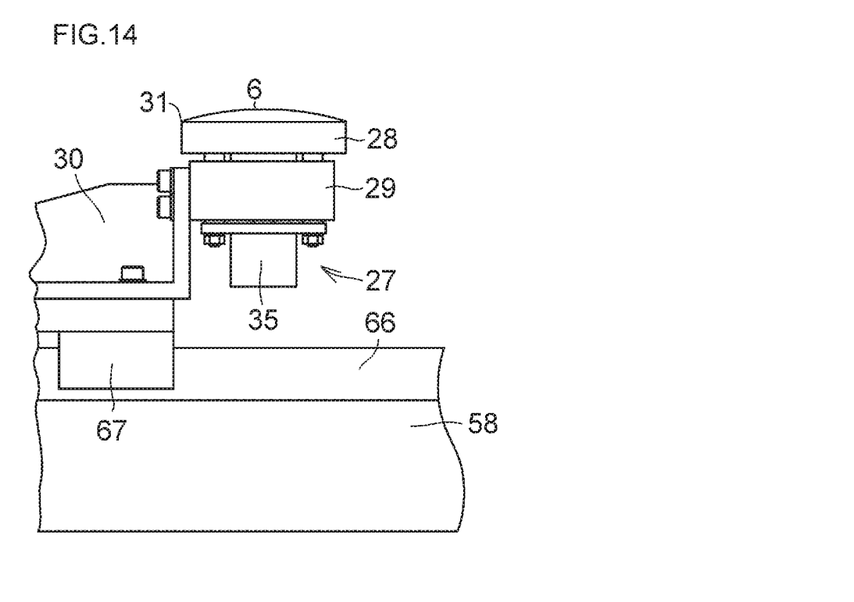
FIG. 14 is an explanatory diagram of a modification of a glass plate receiving surface in the embodiment shown in FIG. 1.
Figure 15:
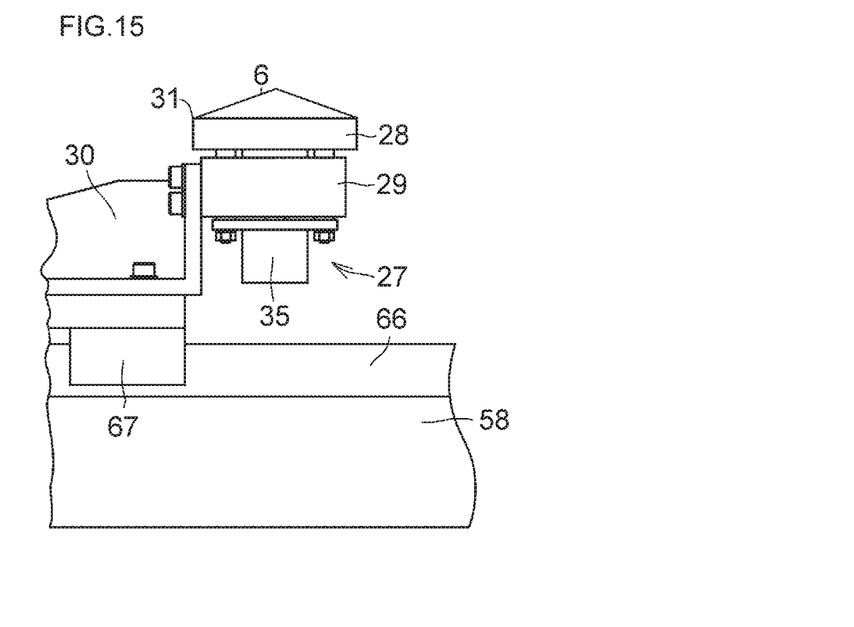
FIG. 15 is an explanatory diagram of another modification of the glass plate receiving surface in the embodiment shown in FIG. 1.

Meanwhile, in the above-described embodiment, the glass plate receiving surface 6 is a flat surface in the same way as the pressing surface 87. However, the glass plate receiving surface 6 may be a partial spherical surface constituted by an outer peripheral surface of a partial sphere, as shown in FIG. 14, or may be a conical surface constituted by an outer peripheral surface of a conical body, as shown in FIG. 15, or may be a truncated conical surface constituted by an outer peripheral surface of a truncated conical body, although not shown.

The aforementioned modifications of the pressing surface 87 and the glass plate receiving surface 6 are also applicable to the pressing surface 87*a* and the glass plate receiving surface 6*a*.

DESCRIPTION OF REFERENCE NUMERALS

1: bend-breaking machine
2: glass plate
3: endless belt
4: supporting member
5: region
6, 6*a*: glass plate receiving surface
7, 7*a*: glass plate receiving device
8, 8*a*: moving device
9, 9*a*: press-breaking device
11: carrying-in and carrying-out means
12: tension imparting means
13: traveling device

The invention claimed is:

1. A machine for bend-breaking a glass plate comprising:
a flexible member on which the glass plate with a cut line formed thereon is configured to be placed;
a supporting mechanism having a supporting surface configured to support the glass plate at a central portion of a lower surface of the glass plate by means of said flexible member;
a glass plate receiving device having a glass plate receiving surface configured to receive the glass plate from a lower surface of the glass plate by means of said flexible member and disposed below said flexible member;
a first moving device configured to move the glass plate receiving device;
a press-breaking device disposed above said flexible member and having a pressing surface configured to press break along a cut line the glass plate with the cut line formed thereon; and
a second moving device configured to move said press-breaking device,
wherein said glass plate receiving device includes a raising and lowering mechanism for the glass plate receiving surface which, in the press-breaking of the glass plate along the cut line by the pressing surface of the press-breaking device, raises the glass plate receiving surface so as to cause a deflection in the glass plate between the cut line on the glass plate and a predetermined pressing area of the glass plate to be pressed by the pressing surface, before pressing of the predetermined pressing area of the glass plate to be pressed by the pressing surface,
a movable receiving member having the glass plate receiving surface formed on one end surface thereof,
a supporting member on which the movable receiving member is mounted so as to be vertically movable, and
a base on which the supporting member is mounted,
wherein:
said raising and lowering mechanism has a cylinder unit which is mounted on the supporting member and has a piston rod which is movably passed via the supporting member and is connected to the movable receiving member,
said first moving device is configured to move said glass plate receiving device such that, at the time of press-breaking of the glass plate by the pressing surface, the glass plate receiving surface is disposed at a position outside a region of the glass plate surrounded in a plan view by the cut line,
said second moving device is configured to move said press-breaking device such that, at the time of press-breaking of the glass plate by the pressing surface, the pressing surface is disposed at the position outside the region of the glass plate surrounded in a plan view by the cut line, in correspondence with the glass plate receiving surface, and
when press-breaking of the glass plate along the cut line by the pressing surface, the cylinder unit is actuated so as to raise the glass plate receiving surface above the support surface of the support mechanism via the movable receiving members, thereby causing an upwardly oriented deflection the glass plate between the cut line on the glass plate and a predetermined pressing area of the glass plate to be pressed by the pressing surface, in the state in which such a deflection has been caused, thereby causing the pressing surface to abut against the glass plate outside the region surrounded by the cut line, and press-breaking the glass plate along the cut line.

2. The machine for bend-breaking a glass plate according to claim 1, wherein said first moving device includes a moving mechanism configured to move the glass plate receiving surface in one direction and in another direction intersecting the one direction, within a plane which is parallel to the surface of the glass plate.

3. The machine for bend-breaking a glass plate according to claim 2, wherein said second moving device includes a moving mechanism configured to move the pressing surface in one direction and in another direction intersecting the one direction, within a plane which is parallel to the surface of the glass plate.

* * * * *